United States Patent [19]

Starner

[11] Patent Number: 4,986,101

[45] Date of Patent: Jan. 22, 1991

[54] PROCESS AND APPARATUS FOR REFORMING BRAKE SHOES

[75] Inventor: Steven J. Starner, Hartford, Mich.

[73] Assignee: Eaton Corporation, Cleveland, Ohio

[21] Appl. No.: 528,522

[22] Filed: May 25, 1990

[51] Int. Cl.$^5$ .............................................. B21D 5/01
[52] U.S. Cl. ......................................... 72/10; 72/389; 29/402.5
[58] Field of Search .................. 29/402.04, 402.05; 72/389, 390, 7, 10, 11, 12; 188/250 B

[56] References Cited

U.S. PATENT DOCUMENTS

| | | | |
|---|---|---|---|
| 2,144,321 | 1/1939 | Bauberger et al. | 72/389 |
| 2,646,836 | 7/1953 | Barrett | 72/390 |
| 3,333,445 | 8/1967 | Mergler et al. | 72/389 |
| 3,713,312 | 1/1973 | Galdabini | 72/10 |
| 4,506,535 | 3/1985 | Eubanks | 72/389 |
| 4,570,475 | 2/1986 | Kerney et al. | 72/412 |
| 4,912,957 | 4/1990 | Petersen et al. | 72/10 |

FOREIGN PATENT DOCUMENTS 0000444 1/1967 Japan ...................................... 72/389

Primary Examiner—David Jones
Attorney, Agent, or Firm—A. E. Chrow

[57] ABSTRACT

A process is provided for automatically reforming rotary drum brake shoes preferably by an apparatus 100 that includes an adjustable sensing member (30) that monitors the distance ("L") between end openings (8) and (12) of a brake shoe (2) supported by support member (26, 26') adjacent its opposite ends. Member (30) generates a reference signal that is compared to stored dimensional standards established therefor and, if not within the limits, a control signal is generated that causes a bending member (20) to bend brake shoe (2) transversely between supports (26, 26') until its configuration falls within the dimensional limits established therefor. Apparatus (100) is preferably operative to first monitor the width ("X") of openings (8) and (12) and, if outside of the tolerance standards established therefor, enable the reforming process to be stopped rather than continue.

10 Claims, 3 Drawing Sheets

PROCESS AND APPARATUS FOR REFORMING BRAKE SHOES

BACKGROUND OF THE INVENTION

This invention relates generally to a process and apparatus for reforming brake shoes and more particularly to a process and apparatus for reforming arcuate drum brake shoes to within dimensional limit standards established therefor that are stored and selectively retrieved for the particular brake shoe being reformed.

Arcuate rotary drum brake shoes have heretofore been made and have been reformed to their original configuration after use by pressing them into a fixed dimensioned die by a process commonly called "coining" in the trade.

Since the size and curvature of the brake shoe differs for different sized rotary drums (such as the difference in rotary drums between light and heavy duty trucks) a separate coining die has been required for each that is costly and time consuming in changing from one brake shoe type to another.

Use of the brake shoe over a period of time often results in a certain degree of warping or distortion from its original configuration. In many instances, the brake shoes are not restored to their original configuration when relined with frictional braking material which characteristically results in rapid wear for their original configuration enabled them to first engage the rotary brake drum along a central region and then flatten with decreased curvature until the entire length of the braking material engage the brake drum so as to promote even wear of the frictional braking material.

Even the "coining" dies herein before described are, in many instances, unable to restore a used brake shoe to its original configuration when the warpage (measured as the deviation from a preestablished standard for the length between ends of the brake shoe) exceed 0.050 inch.

In view of the foregoing, there has existed a need to provide a way to reform arcuate rotary drum brake shoes automatically to within established dimensional limit standards in a manner that is rapid, simple and inexpensive and that further is adaptable to a wide spectrum of brake shoe configurations.

SUMMARY OF THE INVENTION

Accordingly, it is an object of this invention to provide a process and apparatus for reforming arcuate rotary drum brake shoes.

It is another object of this invention to provide a process and apparatus for reforming rotary drum brake shoes to within established dimensional limit standards in a way that is convenient, rapid, and economical.

It is still another object of this invention to provide a process and apparatus for selectively reforming a variety of different arcuate rotary drum brake shoes.

DESCRIPTION OF SOME PREFERRED EMBODIMENTS

Figure 1:
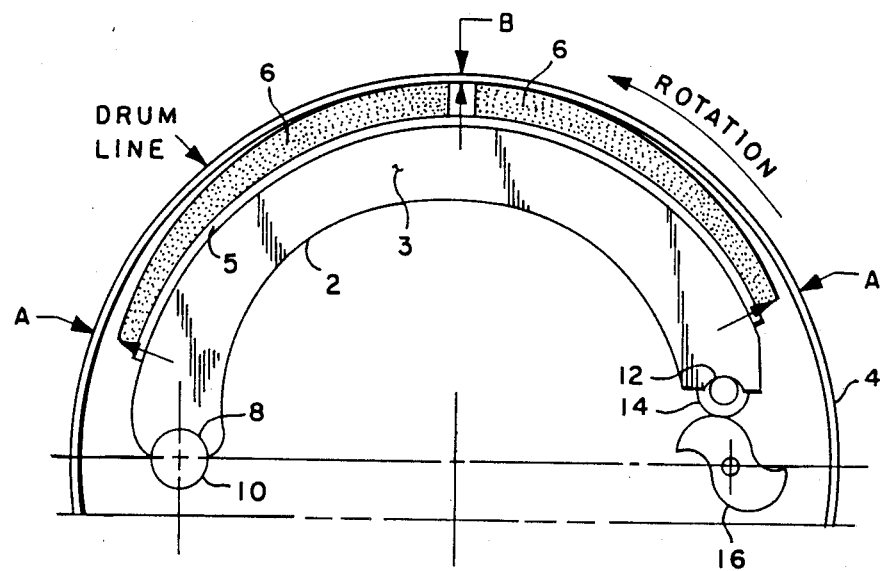
FIG. 1 is a side elevation view of one-half of a rotary drum brake assembly.

The rotary drum brake assembly shown in FIG. 1 is of the type commonly found in automatic vehicles. Where ordinarily there are two diametrically opposed brake shoes connected by springs in an actual brake assembly, only one brake shoe 2 shown for illustrative purposes. Brake shoe 2 characteristically features an arcuate flange 5 to which are transversally secured a pair of spaced-apart support ribs 3 of which only one rib 3 is shown in the side view of FIG. 1.

Brake shoe 2 has pads 6 of a suitable frictional braking material mounted thereupon that engage and frictionally brake rotary drum 4 when the brakes are applied by an operator.

As viewed in FIG. 1, the left end of brake shoe (2) has an opening 8 (commonly called a pin slot) that receives a portion of pin 10 thereinto and enables brake shoe 2 to pivot thereabout in opposite directions when the brake is applied and released by an operator. The right end of brake shoe 2 has an opening 12 operative to receive a cam roller follower 14 that engages rotary "S" cam 16 that rotates in opposite directions when the brakes are applied and released which in turn causes brake shoe 2 to pivot about pin 10 as previously described.

As shown in FIG. 1, brake shoe 2 has an original arcuate configuration that causes frictional braking pads 6 at the central region referenced by the letter "B" to first engage drum 4 when the brakes are initially applied with a clearance at opposite ends of frictional pads 6, referenced by letters "A", that is typically in the order of about 0.030 inch for new brake assemblies. Brake shoe 2 is adapted such that its curvature flattens as the brakes are increasingly applied which causes the braking contract region "B" to spread circumferentially across the center surface of pads 6 to provide a more uniform and effective braking force with substantially even wear occurring across the surface of pads 6 facing towards drum 4.

After a period of operation, brake shoe 2 often may become distorted in addition to requiring replacement of pads 6. The manner by which brake shoe 2 is automatically reformed to within previously established dimensional limit standards is hereinafter described with respect to FIGS. 2 and 3.

Figure 2:
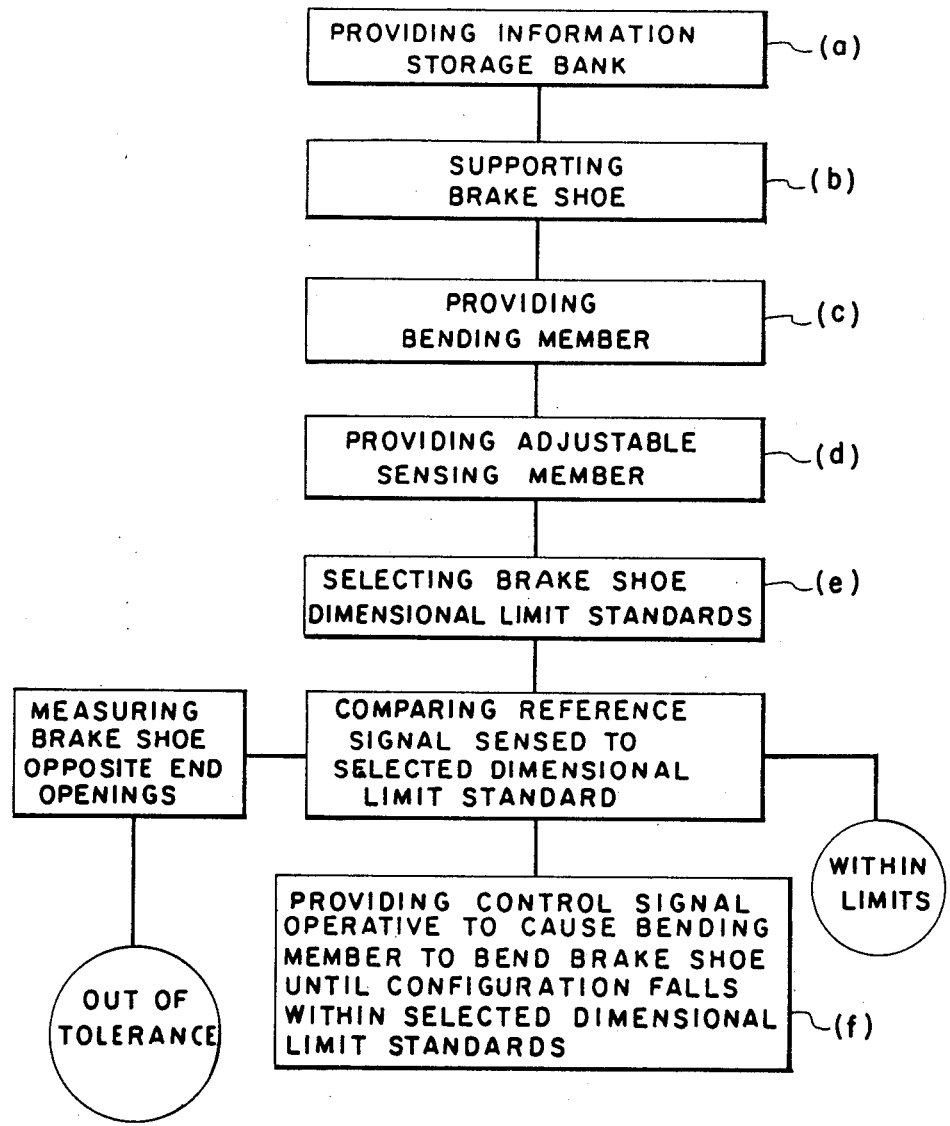
FIG. 2 is a block diagram of a preferred process by which to reform the brake shoe of FIG. 1 when required.

A preferred embodiment of a process by which to reform brake shoe 2 is shown in FIG. 2 in which in step (a) a storage bank of dimensional limit standard information is provided for a predetermined variety of brake shoe types that characteristically differ in size and curvature depending upon the particular vehicle involved.

The type of dimensional data stored includes, for example, the minimal distance between the openings at opposite ends of brake shoe 2 that characteristically increases as brake shoe 2 is repeatedly flattened during use over a period of time. Also of importance is the width of the openings at opposite ends of brake shoe 2 that might be worn to the extent that reforming of the brake shoe is not warranted.

The dimensional limits of these and other configural dimensional limits of interest are thus preferably stored for future retrieval from an information storage bank such as an electronic look-up table enabled by use of ROM (read only memory) units well known to those skilled in the art of the electronic storage of data.

In step (b), brake shoe 2 is supported by spaced-apart supports adjacent its opposite ends and a bending member is provided in step (c) that is operative to engage brake shoe 2 near its center intermediate the supports and bend the brake shoe transversally between the supports in response to receiving a central signal.

The amount of bending required, if any, is provided in step (d) in which an adjustable sensing member is employed that can extend and retract sufficiently to enable opposed engagement portions thereof to rest in the opposite end openings in brake shoe 2 and send a reference signal indicative of the distance therebetween. Such is preferably provided by the adjustable sensing member including an electrical encoder such as the type where a first electrical contact slides along a guide strip and engages and releases sequentially positioned electrical contacts until it comes to rest at the contact corresponding to the distance between the brake shoe opposite end openings and provides an electrical reference signal indicative thereof.

In step (e), the reference signal of step (d) is compared to the dimensional limit standard established therefor for the brake shoe selected and, if within the limits, the process is ended and, if not within the limits, a control signal is generated that causes the bending member to engage and bend the brake shoe transversely between the supports in step (f) until the distance between the brake shoe opposite end openings falls within the dimensional limit standard established therefor.

Shown without reference numerals in FIG. 1 is the step of selectively retrieving the dimensional limit standards for the particular brake shoe to be subjected to the reforming process where the storage bank of step (a) containing dimensional limit standards for a plurality of brake shoe types and which selection may occur at any point prior to step (e).

Preferably, the process of the invention further includes the step of extending and retracting the adjustable sensing member engagement portion of step (d) within the brake shoe opposite end openings to determine the amount of wear (enlargement of width) and then sending a reference signal indicative thereof that is then compared to the dimensional tolerance limit standard established therefor and, if out of tolerance, the process is ended and, if within tolerance, previously described step (f) is then commenced.

Although the process of the invention herein before described is preferably conducted using an electronic storage bank and an adjustable electrical encoder, it is to be understood that the process is not limited to such and that other means of storing retrievable dimension data and monitoring dimensional characteristics may be employed in place of or in combination with the electrical and electronic components.

It is also to be understood that the brake shoe type selecting step may be omitted where the process is operative to only reform a singular brake shoe type and not a variety of different types of brake shoes.

Figure 3:
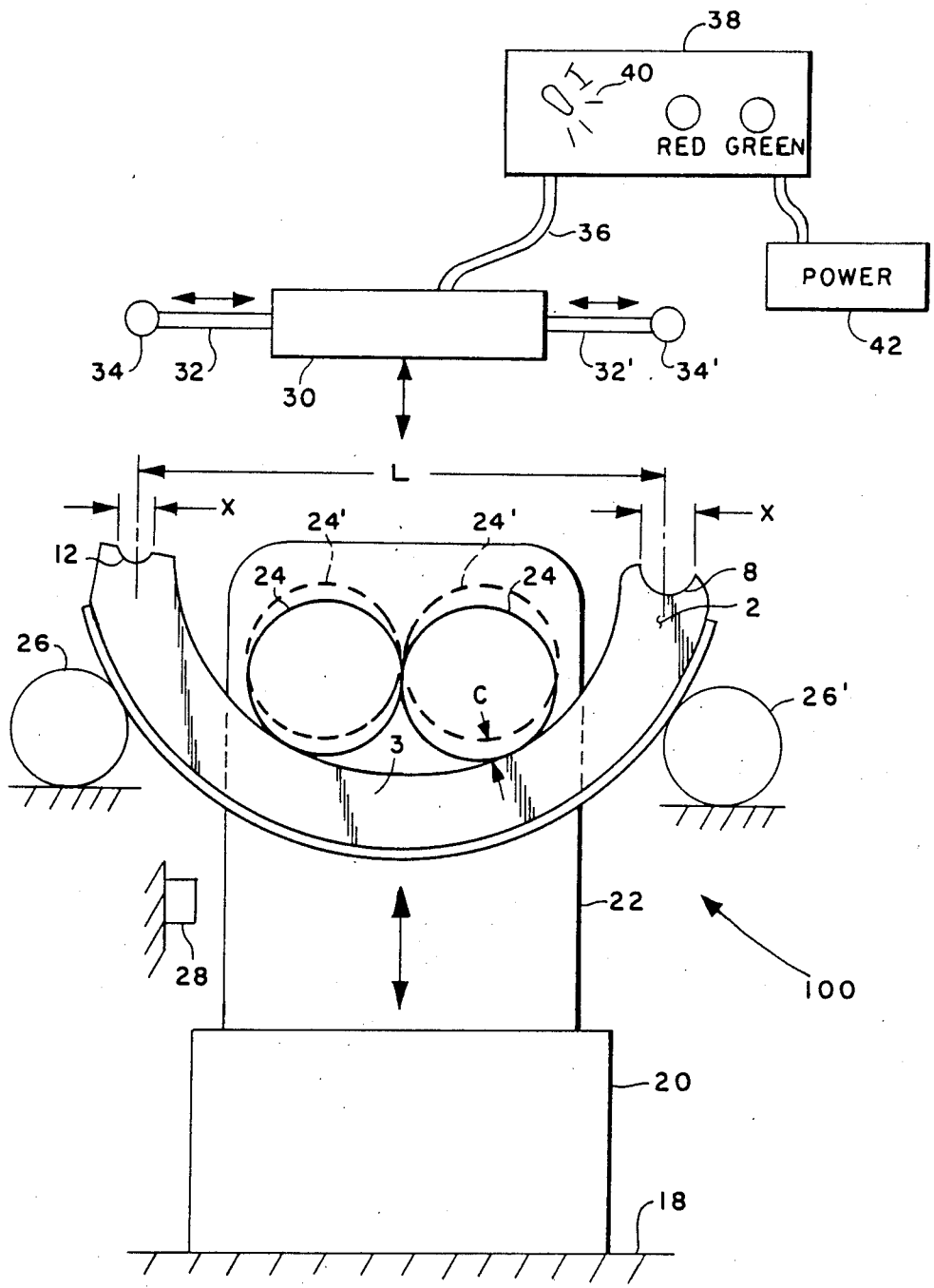
FIG. 3 is a schematic diagram of a preferred embodiment of apparatus 100 operative to reform the brake shoe of FIG. 1 when required.

Apparatus 100 shown in FIG. 3 is illustrative of apparatus embodiment operative to carry out the brake shoe reforming process herein before described. Apparatus 100 has a frame 18 on which is mounted a bending member preferably in the form of a fluid operated cylinder 20 having a piston 22 movable in opposite directions as shown by the arrows. Piston 22 carries a bending component preferably in the form of a pair of adjacent cylinders 24 that are adapted to engage the center region of the inner curved edges of ribs 3 of brake shoe 2 which is supported at opposite ends by fixed spaced-apart support members 26, 26' as shown in FIG. 3.

Although not shown in FIG. 3, cylinders 24 are preferably supported at both ends by piston 22 to increase rigidity.

Apparatus 100 preferably includes a position sensor 28 such as a "Hall Effect" sensor well known to those skilled in the art of position sensing devices. Position sensor 28 operates to stop piston 22 at an initial position referenced by numerals 24' prior to bending such that there is a prescribed clearance "c" between cylinders 24 and the edge of ribs 3 for protection of the operator's hands and fingers.

As shown in FIG. 3, brake shoe 2 has a distance "L" between the opposite end openings that themselves have a width denoted by the letter "X".

Apparatus 100 includes an adjustable sensing member 30, preferably in the form of an electrical encoder as previously described. Member 30 preferably includes opposite end components 32, 32' that respectively carry pins 34 and 34' that are adapted to be received into and rest within openings 8 and 12. At least one of end components 32 and 32' is extendable and retractable as shown by the arrows to enable pin ends 34 and 34' to rest in openings 12 and 8 respectively.

A reference signal is generated and conveyed through conductor 36 to storage bank and control module 38 while member 30 is being adjusted so that pins 34 and 34' rest in openings 12 and 8 respectively. The reference signal is indicative of the length "L" between openings 8 and 12. Likewise, a reference signal is generated by member 30 when it is extended and retracted to measure width "X" of openings 8 and 12 as previously described.

Selector 40 on module 38 is rotated to select the retrievable dimensional limit standards stored for the particular brake shoe being subjected to the reforming process.

Module 38 and member 30 are powered by a suitable power supply 42 and the reference signal indicative of actual distance "L" is compared to the stored dimensional limit standard therefor and, if within the dimensional limit standard, the process need not continue and preferably a signal is then provided such as by excitation of the green light shown on module 38. If the actual length "L" is outside of the dimensional limit standard, a control signal is generated that actuates fluid cylinder 20 and causes piston 22 to move downwardly such that brake shoe 2 is engaged by cylinders 24 and bent transversally downwardly between support 26 and 26' until the reference signal indicates that the distance "L" is within the dimensional limit standard established therefor. Preferably, a signal is then generated, such as by excitation of the red light shown on module 38, that then changes to the green light signal when the actual distance "L" being monitored by member 30 falls within the dimensional limit standards established therefore.

As previously described, apparatus 100 preferably operates to first measure the width "X" of openings 8 and 12 and, if within the tolerance standards established therefore, a visual signal such as the green light is excited and apparatus 100 preferably operates to first measure the width "X" of openings 8 and 12 and, if within the tolerance standards established therefor, a visual signal such as the green light is excited and apparatus 100 then proceeds to automatically measure distance "L" as described above and, if not within the tolerance limit standards established therefore, the process is stopped and preferably a signal is provided, such as by excitation of the red light, indicating to the operator that at least one of openings 8 and 12 is out of tolerance so that the reforming process need not continue.

It is to be understood that, although the distance "L" and widths "X" are preferably monitored by apparatus 100 in the brake shoe reforming process, other dimensional characteristics of the configuration of the brake shoe may be employed provided they are monitorable and comparable to established dimensional limit standards for the brake shoe being subjected to the reforming process.

Although apparatus made in accordance with the invention is preferably operative to automatically reform a variety of difference brake shoes, it is again to be understood that the invention includes apparatus operative to reform only a singular type of brake shoe where such is desired.

What is claimed is:

1. A process for reforming an arcuate brake shoe having openings at opposite ends thereof to within established dimensional limit standards, said process including the steps of:
   (a) providing a storage bank of retrievable dimensional limit standards for at least one type of brake shoe to subjected to the reforming process;
   (b) supporting opposite ends of the brake shoe on spaced-apart support members;
   (c) providing a bending member operative to engage and bend the brake shoes transversely between the supports in response to a control signal;
   (d) providing an adjustable sensing member operative to extend and retract sufficiently to enable respective engagement portions thereof to rest in the brake shoe openings and cause the sensing member to provide a reference signal indicative of the distance therebetween;
   (e) comparing the reference signal to the selected dimensional limit standards established therefor; and
   (f) providing the control signal operative to cause the bending member to bend the brake shoe transversely between the supports until the brake shoe configuration is brought within the dimensional limit standards established therefor.

2. The process of claim 1 wherein the storage bank of step (a) includes retrievable dimensional limit standard data for a plurality of brake shoe types and a step is included for selectively retrieving the dimensional limit standards associated with the particular brake shoe to be subjected to the reforming process.

3. The process of claim 1 including the step of extending and retracting the sensing member engagement portion within the brake shoe openings and comparing a reference signal indicative thereof to the dimensional tolerance standard established for the openings; and
   (i) if within the dimensional tolerance standard, enabling the reforming of the brake shoe to proceed; or
   (ii) if not within the dimensional tolerance standard, enabling cessation of the reforming process.

4. The process of claim 1, 2 or 3 including the step of bringing the bending member to within a prescribed distance from the brake shoe and holding the bending member thereat prior to bending the brake shoe.

5. Apparatus for reforming an arcuate brake shoe having openings at opposite ends thereof to within established dimensional limit standards, said apparatus including;
   a frame;
   a storage bank of selectively retrievable dimensional limit standards for at least the type of brake shoe to subjected to reforming by the apparatus;
   a pair of supports mounted on the frame for supporting opposite ends of the brake shoe;
   a bending member mounted on the frame and operative to engage and bend the brake shoe transversely between the supports in response to a control signal;
   a bending member mounted on the frame and operative to engage and bend the brake shoe transversely between the supports in response to a control signal;
   an adjustable sensing member operative to extend and retract sufficiently to enable opposite engagement portions thereof to rest in the brake shoe openings and cause the member to provide a reference signal indicative of the distance therebetween; and
   means for comparing the reference signal to the dimensional limit standard established therefor;
   said apparatus operative such that when the comparison determines that the distance between the brake shoe openings is not with the dimensional limit standard established therefor, the control signal is generated that causes the bending member to engage and bend the brake shoe transversely between the supports until the brake shoe configuration falls within the dimensional limit standards established therefor.

6. The apparatus of claim 5 wherein the storage bank includes retrievable dimensional standard data for a plurality of brake shoe types and a selector member is included for selectively retrieving the dimensional limit standards associated with the particular brake shoe to be subjected to the reforming process by the apparatus.

7. The apparatus of claim 5 wherein the adjustable sensing member is operative to extend and retract the opposed engagement portion within the brake shoe openings and the apparatus is operative to compare the reference signal indicative thereof to the dimensional tolerance standard established for the openings; and
   (i) if within the dimensional standard, to enable the reforming of the brake shoe to proceed; or
   (ii) if not within the dimensional standard, to enable cessation of the reforming process.

8. The apparatus of claim 5, 6, or 7 including means for positioning the bending member within a prescribed distance from the brake shoe and holding the bending member thereat prior to engaging and bending the brake shoe.

9. The apparatus of claim 8 wherein the means for positioning the bending member comprises a proximity sensor.

10. The apparatus of claim 5 wherein the adjustable sensing member includes an electrical encoder and the reference signal is an electrical signal.

* * * * *